United States Patent
Oisi

[15] 3,696,934
[45] Oct. 10, 1972

[54] APPARATUS FOR CENTRIFUGALLY SEPARATING IMPURITIES FROM FLUID SUSPENSIONS

[72] Inventor: Saburo Oisi, 7-1, 6-chome Oguro, Shizuoka-shi, Japan

[22] Filed: Jan. 24, 1968

[21] Appl. No.: 700,135

[30] Foreign Application Priority Data

Sept. 2, 1967    Japan ..................... 42/56498

[52] U.S. Cl. ............................................ 210/512
[51] Int. Cl. ............................................ B01d 21/26
[58] Field of Search ...... 210/304, 311, 512, 532, 537, 210/84; 209/144, 211; 55/191, 205, 460

[56] References Cited

UNITED STATES PATENTS

| | | |
|---|---|---|
| 2,816,490 | 12/1957 | Boadway et al. ........... 210/512 |
| 2,927,693 | 3/1960 | Freeman et al. ............ 209/211 |
| 3,007,542 | 11/1961 | Giampapa et al. ........ 55/191 X |

Primary Examiner—Reuben Friedman
Assistant Examiner—T. A. Granger
Attorney—Robert E. Burns

[57] ABSTRACT

An apparatus for removing objectionable impurities from a fluid suspension of pulp or paper-making material in the manufacture of paper. The apparatus comprises a cylindrical separating chamber through which flows a fluid suspension vortex containing high and low density impurities whereby the impurities are centrifugally separated as a function of their density. The most dense impurities are flung radially outwardly from the fluid suspension vortex whereby they are entrained and carried away by a water vortex which encircles the fluid suspension vortex and advances through the separating chamber in a direction opposite to that of the fluid suspension vortex.

2 Claims, 5 Drawing Figures

PATENTED OCT 10 1972　　3,696,934

APPARATUS FOR CENTRIFUGALLY SEPARATING IMPURITIES FROM FLUID SUSPENSIONS

This invention relates to apparatus for separating foreign matters from a pulp suspension and more particularly to a separator of the vortex type adapted for use in the manufacture of paper.

Recently, unrefined suspension of paper-making material is often found containing increased amounts of foreign matters and extraneous materials of low specific gravity such as light-weight pulp cells and fine plastic particles which owe their origin mainly to reclaimed papers. Obviously, for the interest of manufacturing high-graded papers, it is necessary to remove these impurities as much as possible from the pulp suspension. Known separators are not capable of fully removing such low specific gravity materials from the pulp suspension. Many attempts have been made to improve the function of a foreign matter separator; however, none of them proved satisfactory.

One successful approach has been to remove foreign matters of a relatively low specific gravity and dirt of a relatively high specific gravity simultaneously from the suspension of paper-making material by means of a cylindrical separating chamber. Such an approach is disclosed in Japanese Pat. Application No. 31866/40.

The present invention constitutes an improvement in the device described in the above-identified application wherein the fluid suspension entraining both high and low specific gravity foreign particles is pumped into a vertically disposed cylindrical or conical separating chamber through a tangential tubular inlet provided at the lower end thereof which converts the flowing fluid suspension into a vortex flow as it advances up through the chamber while water is continuously fed into the chamber through another inlet provided at its upper end. With such construction, light-weight plastic particles and other foreign matters usually called "dirt" of a relatively high specific gravity are separated simultaneously from the suspension of pulp or paper-making material.

The primary object of my instant invention is to provide a useful apparatus which is simple in construction and reliable in operation for effectively separating and removing objectionable foreign matters of different specific gravity.

Briefly stated, the inventive concept of the present invention resides in the formation of a fluid vortex from the stream of a pulp suspension, for which purpose a cylindrical separator is employed. The cylindrical separator has at least two tangential inlets, one of which is located at the bottom and adapted for admission of the pulp suspension tangentially up through the cylinder, and the other at the top for introduction of water similarly tangentially down through the cylinder.

More specifically, the apparatus comprises a vertically disposed cylindrical separating chamber provided with a bottom casing or head portion having a first vortex forming section for pulp suspension, a tangential tubular inlet connected thereto for the admission of the pulp suspension therethrough, an inwardly tapering nozzle portion integral with said section and a tubular outlet for the discharge of high specific gravity materials, and an upper casing or head portion having a second vortex forming section for water, a tangential tubular inlet connected thereto for the introduction of water therethrough, a relatively large tubular section mounted on said second vortex forming section and having a horizontally extending tubular outlet for the withdrawal therethrough of the pulp suspension which has been refined under the influence of a helical vortex action imparted thereto and in contact with vortex water stream and a relatively small upright tubular outlet disposed concentrically of the chamber and adapted for the discharge therethrough of low specific gravity materials, said water tubular inlet extending in the same tangential direction with said pulp suspension tubular inlet.

These and other features of the present invention will be apparent from the following description taken in conjunction with the accompanying drawings, in which.

Figure 1:
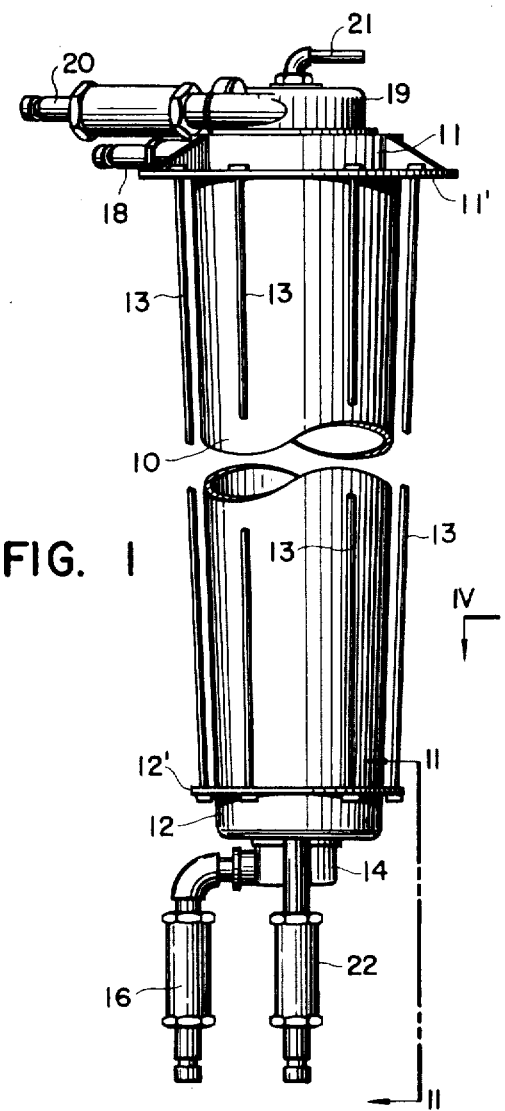
FIG. 1 is a fragmentary front elevation of the separator according to my invention.
Figure 2:
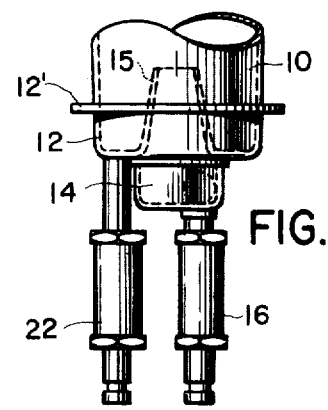
FIG. 2 is a side elevation of a lower portion of the separator shown in FIG. 1 looking in the direction of the arrows II—II.

A cylindrical or conical elongated separating chamber 10 may be supported preferably vertically on a machine frame (not shown). The chamber 10 has its upper and lower ends respectively sealingly connected with upper casing or head 11 and a lower casing or head 12. The upper and lower casings 11 and 12 are provided with flange members 11' and 12', respectively, which are secured by suitable means or stays 13 to the chamber 10. The lower casing 12 has a vortex forming section 14 integrally formed therewith and an inwardly tapering or convergingly tapering nozzle portion 15 opening into the chamber 10. There is provided a tubular inlet 16 which is integral with the section 14 and tangentially extends with respect to the cylindrical chamber 10. This tubular inlet is connected with a pressure pump (not shown).

Figure 3:
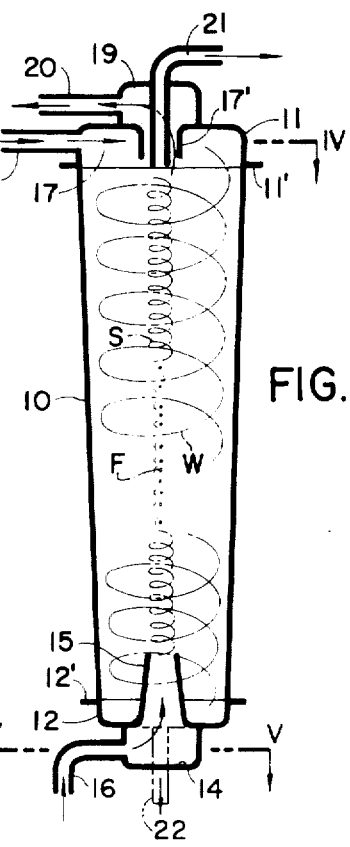
FIG. 3 is a partially cross-sectional elevation of the separator, schematically illustrating the manner in which the pulp suspension vortex stream and the water vortex stream make their respective helical movements.

The upper casing 11 includes a vortex forming section 17 into which tangentially extends a water delivery tube 18. The section 17 is, functionally, a cylindrical extension of the chamber 10 which is annularly recessed in the center of the casing 11 as indicated at 17' in FIG. 3. This annular section 17' serves as an exit for the upwardly advancing pulp suspension S. On top of the upper casing 11 is mounted a relatively large tubular section 19 having integral therewith a horizontally extending tubular outlet 20 for the withdrawal therethrough of the pulp suspension which has been refined in contact with vortical water stream.

Designated at 21 is a tube extending vertically through the tubular section 19 and extending into the chamber 10 as far down as to a point substantially flush with the flange member 11'. This tube is adapted to remove a lighter portion of the impurities entrained with the pulp suspension.

Designated at 22 is a drain pipe extending from the bottom of the lower casing 12. This pipe is used to drain the mixture of water and heavy impurities or dirt.

Figure 5:
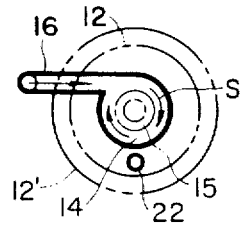
FIG. 5 is a horizontal cross-section taken along the line V—V of FIG. 3, schematically showing the direction of the vortex imparted to the pulp suspension.

With this construction, a stream of pulp suspension is delivered under pressure tangentially into the vortex forming section 14 via inlet tube 16, at which section the stream S is subjected to rotational motion in the manner schematically illustrated in FIG. 5. The stream S advances helically through the tapering nozzle 15 and up through the interior of the chamber 10. On passage through this nozzle portion of the casing 12, the pulp suspension grows more vortical. As the suspension vortex stream S thus ascends toward the exit 17', the impurities undergo radial separation and the impurities of a relatively high specific gravity or high density are thrown out of the radius of the vortex and forced towards the peripheral wall of the chamber 10 under the influence of centrifugal inertia exerted by the helical vortex. These heavy foreign matters are further forced downwardly toward the bottom of the chamber 10 in contact with the water, which is introduced into the chamber 10 through the inlet tube 18 and whirled about the radius of the suspension vortex S as it enters into the water forming section 17. The heavy impurities are thus carried by the water vortex W which encircles the vortex S, until they are finally discharged through the drain pipe 22 at the bottom of the chamber 10.

The fine foreign particles F of a relatively low specific gravity or low density entrained with the pulp suspension are held free from the influence of the centrifugal inertia and stay at the center of rotation of the vortex S, until they are forced out of the chamber 10 and out through the vertically disposed tube 21.

Figure 4:
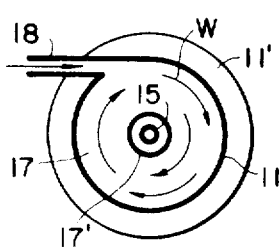
FIG. 4 is a horizontal cross-section taken along the line IV—IV of FIG. 3, schematically showing the direction of the vortex imparted to the water.

It will be noted that the vortex forming sections 14 and 17 are of a similar construction which permit the pulp suspension vortex S and the water vortex W to progress similarly clockwise, as illustrated in FIGS. 4 and 5. It will be thus understood that the helical movement of the water encourages the vortex of the pulp suspension and enhances the centrifugal separation of foreign matters from the pulp suspension stream.

The method of the present invention comprises providing a fluid suspension containing therein impurities of varying densities which are to be separated. The fluid suspension is then vortically flown to to effect radial separation of the impurities as a function of their density and the fluid suspension vortex S is advanced upwardly in one direction through the separating chamber 10. As aforementioned, the more dense impurities are centrifuged radially outwardly whereas the less dense impurities F remain substantially at the center of the fluid suspension vortex.

Another fluid, such as water, is vortically flown around the fluid suspension vortex and is advanced through the separating chamber in a direction opposite to that of the fluid suspension vortex. The water vortex W entrains therein the dense impurities which have been centrifuged to the outer peripheral portion of the fluid suspension vortex and carries them to the lower end of the separating chamber where they are removed. At the upper end of the separating chamber, the low density impurities and the fluid suspension are separately removed.

What is claimed is:

1. An apparatus for separating both high and low density impurities from a fluid suspension comprising: means defining an elongated separating chamber; fluid suspension flow means for longitudinally flowing a fluid suspension vortex containing high and low density impurities therein through substantially the entire length of said separating chamber in a given direction to effect radial separation of the impurities as a function of their density; water flow means for longitudinally flowing a water vortex through substantially the entire length of said separating chamber in a direction opposite to said given direction encircling said fluid suspension vortex to effect removal of the high density impurities; removal means disposed at one end of said separating chamber for removing therefrom the water and high density impurities; means disposed at the other end of said separating chamber for separately removing the fluid suspension and the low density impurities said last-mentioned means including means defining a central aperture in said other end, a first tubular section in communication with said aperture to receive therein the fluid suspension, and a second tubular section coaxial with said first tubular section and extending into said separating chamber dimensioned to receive therein the low density impurities which are too light to be radially separated during the flow of said fluid suspension vortex.

2. An apparatus for separating both high and low density impurities from a fluid suspension comprising: means defining an elongated separating chamber; fluid suspension flow means for longitudinally flowing a fluid suspension vortex containing high and low density impurities therein through substantially the entire length of said separating chamber in a given direction to effect radial separation of the impurities as a function of their density; water flow means for longitudinally flowing a water vortex through substantially the entire length of said separating chamber in a direction opposite to said given direction encircling said fluid suspension vortex to effect removal of the high density impurities; removal means disposed at one end of said separating chamber for removing therefrom the water and high density impurities; means disposed at the other end of said separating chamber for separately removing the fluid suspension and the low density impurities, said fluid suspension flow means comprising a head portion having a convergingly tapered portion connected to said separating chamber at said one end, and means for tangentially supplying the fluid suspension into said head portion; said water flow means comprising another head portion connected to said separating chamber at said other end, and means for tangentially supplying the water into said another head portion, said means for separately removing the fluid suspension and the low density impurities comprising means defining an aperture in said another head portion, a first tubular section in communication with said aperture to receive therein the fluid suspension, and a second tubular section coaxial with said first tubular section and extending through said another head portion into said separating chamber dimensioned to receive therein the low density impurities which are too light to be radially separated during the flow of said fluid suspension vortex.

* * * * *